United States Patent [19]
Jairazbhoy et al.

[11] Patent Number: 5,669,813
[45] Date of Patent: Sep. 23, 1997

[54] APPARATUS FOR STORING AND COOLING ELECTRONIC DEVICES AND/OR MODULES IN A VEHICLE

[75] Inventors: Vivek Amir Jairazbhoy; Prathap Amerwai Reddy, both of Farmington Hills; John Trublowski, Troy; Jay DeAvis Baker, West Bloomfield; Lawrence Leroy Kneisel, Novi, all of Mich.

[73] Assignee: Ford Motor Company, Dearborn, Mich.

[21] Appl. No.: 642,725

[22] Filed: May 3, 1996

[51] Int. Cl.⁶ ............................................. B60H 1/26
[52] U.S. Cl. .................. 454/69; 62/259.2; 361/695; 4454/148
[58] Field of Search ................... 454/69, 143, 146, 454/148; 200/289; 361/678, 695; 62/259.2

[56] References Cited

U.S. PATENT DOCUMENTS

| | | | |
|---|---|---|---|
| 3,590,136 | 6/1971 | Kunishi et al. | 174/50 |
| 3,643,457 | 2/1972 | Winkler | 62/140 |
| 4,194,585 | 3/1980 | Prince | 180/90 |
| 4,522,114 | 6/1985 | Matsuno . | |
| 4,591,202 | 5/1986 | Burk et al. | 296/194 |
| 4,674,704 | 6/1987 | Altoz et al. | 244/1 R |
| 4,750,087 | 6/1988 | Carpenter et al. | 361/383 |
| 4,750,265 | 6/1988 | Watanabe et al. | 29/854 |
| 4,824,164 | 4/1989 | Nakayama et al. | 296/146 |
| 4,942,499 | 7/1990 | Shibata et al. | 361/428 |
| 4,943,241 | 7/1990 | Watanabe et al. | 439/34 |
| 5,012,656 | 5/1991 | Tamura | 62/498 |
| 5,063,476 | 11/1991 | Hamadah et al. | 361/384 |
| 5,088,571 | 2/1992 | Burry et al. | 180/90 |
| 5,218,513 | 6/1993 | Brown | 361/384 |
| 5,322,471 | 6/1994 | Bauer et al. | 454/69 |
| 5,353,190 | 10/1994 | Nakayama et al. | 361/647 |
| 5,354,114 | 10/1994 | Kelman et al. | 296/192 |
| 5,358,300 | 10/1994 | Gray | 296/192 |
| 5,364,159 | 11/1994 | Kelman et al. | 296/192 |
| 5,370,417 | 12/1994 | Kelman et al. | 280/751 |
| 5,442,518 | 8/1995 | Beam | 361/690 |
| 5,481,885 | 1/1996 | Xavier et al. | 62/259.2 |

FOREIGN PATENT DOCUMENTS 55-69791  5/1980  Japan ............................ 454/69

*Primary Examiner*—Harold Joyce
*Attorney, Agent, or Firm*—Paul K. Godwin; Roger L. May

[57] ABSTRACT

An apparatus for cooling electronic devices/modules in a vehicle comprises a main ventilation duct mounted in the vehicle, and includes a blower for forcing air through the main duct. A bypass duct is provided in selective fluid communication with the main ventilation duct, and is adapted to carry electronic devices/modules to be cooled by air forced through the bypass duct. Inlet and outlet valves are provided for selectively varying the amount of air which passes through the bypass duct. The electronic devices may be positioned outside of the bypass duct, or inside the bypass duct if sealed.

10 Claims, 2 Drawing Sheets

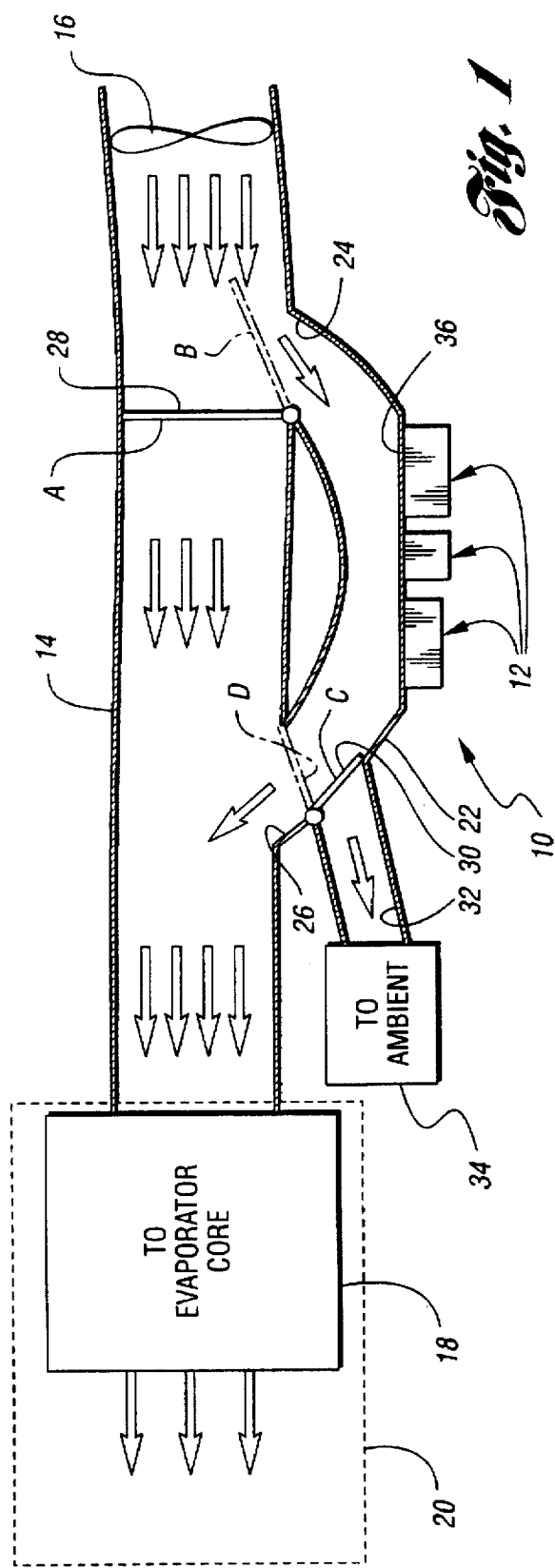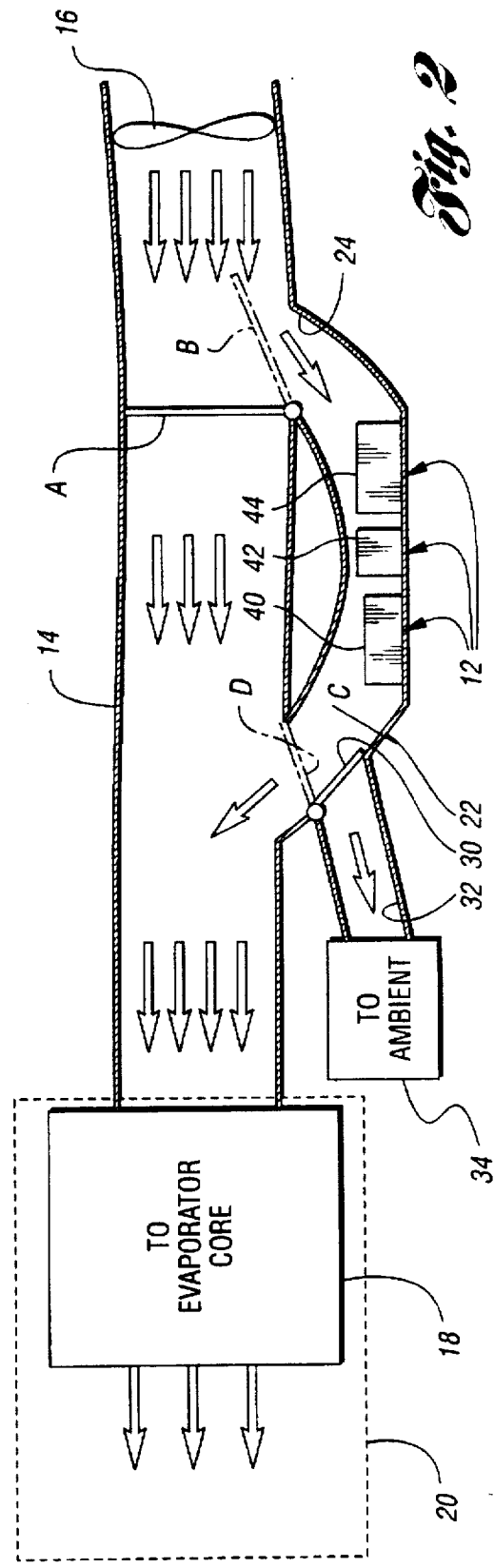

APPARATUS FOR STORING AND COOLING ELECTRONIC DEVICES AND/OR MODULES IN A VEHICLE

TECHNICAL FIELD

The present invention relates to an apparatus for securing electronic devices in a vehicle and, more particularly, to an apparatus for cooling electronic devices and/or modules secured adjacent a ventilation duct.

BACKGROUND OF THE INVENTION

Typically, electronic devices and/or modules mounted beneath a vehicle instrument panel are secured on a thin substrate enclosed within a metal box bundles of wires running into and out of the metal box. The metal box must be mounted to a support structure beneath the instrument panel and supported in an appropriate position, preferably behind the center stack bezel of the instrument panel for providing electronic support to the vehicle temperature control and sound systems, as well as other electronic instrument panel components.

This assembly can consume a substantial amount of space beneath the instrument panel. The bulky metal box with bundles of wires extending therefrom will have substantial space requirements, and will adversely affect packaging design efficiency in the vehicle. Furthermore, the metal box adds to manufacturing costs.

It is desirable to provide an apparatus for housing and cooling such electronic devices beneath the instrument panel assembly in a manner in which packaging efficiency are improved.

DISCLOSURE OF THE INVENTION

The present invention overcomes the above-referenced shortcomings of prior art assemblies by providing a bypass duct in selective communication with a main ventilation duct in a vehicle, the bypass duct being adapted to carry electronic devices to be cooled by air forced through the bypass duct. In this manner, the existing ventilation system can be used for both mounting and cooling electronic components.

By providing electronics on a bypass duct as opposed to a main duct, problems such as excessive noise, flow disturbance and pressure drop are avoided. Mounting the electronics in a main duct with a high flow rate would cause such problems.

More specifically, the present invention provides a main ventilation duct mounted in the vehicle and including a blower for forcing air through the main ventilation duct. A bypass duct is provided in selective communication with the main ventilation duct, and is adapted to carry electronic devices/modules to be cooled by air forced through the bypass duct. The bypass duct includes inlet and outlet portions in selective fluid communication with the main ventilation duct and an optional ambient opening formed adjacent the outlet. An optional inlet valve is positioned adjacent the inlet portion for selectively diverting flow from the main ventilation duct through the bypass duct. An optional outlet valve is positioned adjacent the outlet port for selectively alternatively blocking air flow through the outlet portion and the ambient opening.

Accordingly, an object of the present invention is to provide an apparatus for securing electronic devices/modules with respect to the main ventilation duct, while using air, forced through the main duct to cool the electronic devices.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a schematic diagram of an apparatus for mounting and cooling electronic devices in a vehicle in accordance with the present invention, with the electronic devices disposed outside the bypass duct;

FIG. 2 shows an alternative embodiment of an apparatus for cooling electronic devices in a vehicle in accordance with the present invention, with the electronic devices disposed within the bypass duct.

DETAILED DESCRIPTION OF THE PREFERRED EMBODIMENTS

Figure 3:
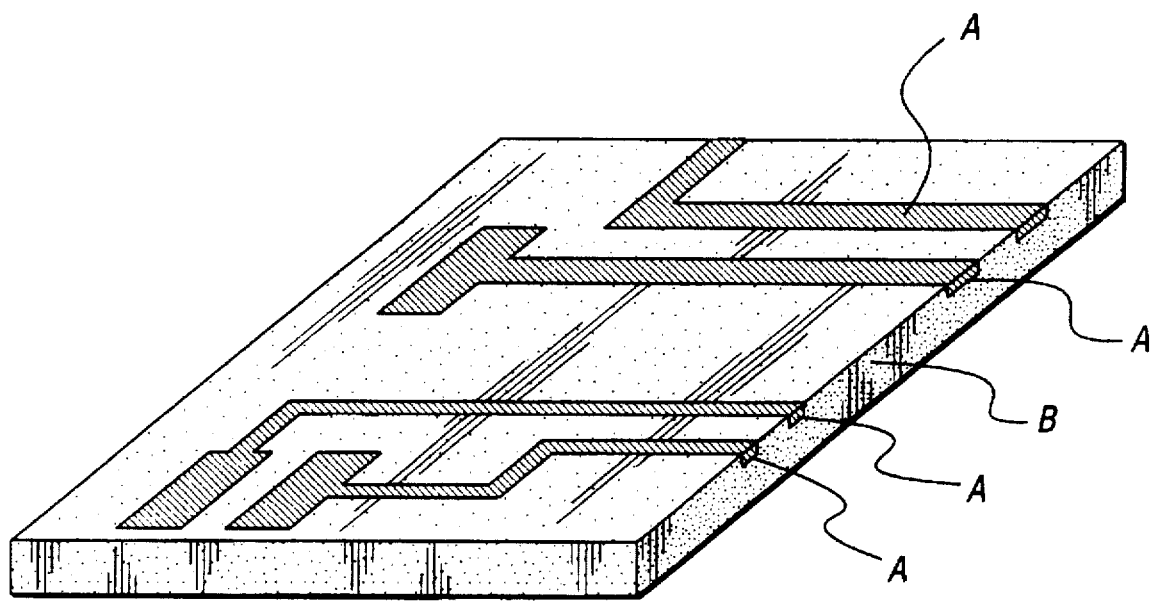
FIG. 3 shows a cut-away perspective view of an alternative co-injection molded support component in accordance with the present invention.

The present invention, as shown in FIG. 1, discloses an apparatus 10 for cooling electronic devices 12 in a vehicle. The invention provides a means for integrating electronic components into the climate control ducting system of an automobile.

As shown schematically in FIG. 1, the apparatus 10 includes a main ventilation duct 14 with a main blower 16 disposed therein for pushing air through the main ventilation duct 14 to the evaporator core 18, and throughout the climate control system 20. A bypass duct 22 is disposed adjacent the main duct 14 for carrying the electronic devices 12. The bypass duct includes an inlet portion 24 in communication with the main ventilation duct 14, and an outlet portion 26 in communication with the main ventilation duct 14. The bypass duct 22 is in selective fluid communication with the main ventilation duct 14 for selectively cooling the electronic devices 12.

An inlet valve 28 is positioned adjacent the inlet portion 24 for selectively diverting air flow from the main ventilation duct 14 through the bypass duct 22. The inlet valve 28 is movable between position A, shown in FIG. 1, in which the main ventilation duct 14 is completely blocked and all air flow is directed through the bypass duct 22, and position B, shown in phantom in FIG. 1, in which only a portion of the air flow from the main blower 16 is directed through the bypass duct 22.

An outlet valve 30 is positioned adjacent the outlet portion 26 of the bypass valve 22. The outlet valve is movable between position C, shown in FIG. 1, in which the channel 32 leading to ambient 34 is completely blocked and all flow is directed through the outlet portion 26 of the bypass valve 22, and position D, shown in phantom in FIG. 1, in which the outlet portion 26 of the bypass valve 22 is completely blocked and all air flow through the bypass duct 22 is directed to ambient 34 through the conduit 32.

Outlet valve 30 will be in position C for floor air, mix, or window defrost selections for the vehicle ventilation system. Outlet valve 30 will be in position D for panel vent, air conditioning, or main blower "off" selections. Inlet valve 28 will be in position A when the main blower is shut off. Inlet valve 28 will be in position B at all times except when the panel vent is off.

In the embodiment illustrated in FIG. 1, the electronic devices are shown mounted externally to the bypass duct 22.

In order to improve heat dissipation into the bypass duct 22 from the electronic devices 12, the electronic devices 12 are mounted on a metal plate 36, which improves thermal management. The metal plate 36 could either be fastened into a duct opening, or integrally molded from the duct. Conventional heat transfer enhancement techniques, such as the use of fins, may also be employed.

The heat generated by the electronic devices 12 may be used to augment heating to the passenger compartment, or to augment window defrost, when required. Optionally, the heat may be dispersed into the ambient 34 when the passenger compartment is not heated.

An alternative embodiment of the present invention is shown in FIG. 2. This embodiment is identical to that shown in FIG. 1, except that the electronic devices 12 are disposed within the bypass duct 22 for improved heat transfer. This configuration also saves space within the vehicle for improved packaging efficiency. In this embodiment, the electronic devices 12 are stored within sealed containers 40, 42, 44. If the containers 40, 42, 44 are not sealed, the cooling air may require appropriate filtering and dehumidification to protect sensitive electronic components.

In other embodiments, the electronic devices 12 may be mounted on the main duct 14, or at an appropriate location downstream of the evaporator core 18. Optionally, a secondary blower may be added to draw air into the bypass duct 22.

By integrating the electronic components into a localized region near the instrument panel, minimization of wire harness lengths and interconnections is accomplished, both of which contribute substantially to the weight, complexity and ultimately the cost of producing a vehicle.

The electronic devices will be interconnected with a plurality of circuit traces Which are laid against the supporting molded component. Several methods are known for the production of electronic circuitry on three dimensional parts. For example, a pattern plating process consists of electroless copper deposition followed by plating resist deposition, photo imaging the plating resist, solvent developing the plating resist; and electroplating copper; and a panel plating process consists of electroless copper deposition followed by electrolytic copper deposition over the entire part. In the panel plating process, the electrical circuit traces are formed by either laser ablation or selective etching using photo-imaged etch resist. Further examples include metal foil embossing where copper foil is stamped onto a three dimensional part using a complex, machined stamping dye; in-molding flexible film circuitry during the injection molding process; and embedded wire technology in which insulated electrical wiring is ultrasonically embedded into a plastic surface.

All of these processes rely on material characteristics of the substrate to which they are applied to meet various electrical/electronic requirements. For example, electronic grade substrate materials must be able to withstand severe manufacturing environments including harsh solvent exposures and high temperature soldering processes. Some polymeric substrate materials exist with adequate thermal, chemical, and physical properties to withstand such operations. Examples of such materials include polyetherimide (PEI), polyethersulfone (PES), and liquid crystal polymers (LCP). However, these materials are often prohibitively expensive, difficult to process, and have limited design potential.

Some common engineering plastics cannot withstand the processing or operational environments encountered in electrical/electronic applications. These materials, for example, cannot withstand exposure to typical circuit processing chemicals including etchants, solvents, and plating chemicals. These resin systems, however, offer superior mechanical and design properties at a fraction of the cost of typical electronic/electrical grade materials.

The present invention utilizes methods known in plastic processing to fabricate a multi-polymer structure having the desired mechanical and electronic grade properties. Electronic grade resin systems are those materials capable of meeting printed wiring board manufacturing process requirements. The areas of the multi-polymer structure containing electronic grade resin materials will be circuitized using known methods such as electroplating, or embossing, and are then populated with electronic components. These areas will be processed according to conventional circuit board assembly manufacturing processes. The structure created will further incorporate low cost engineering thermoplastic resins as the main structural component. Within the same structure, therefore, selective areas of electronic/electrical grade resin systems may be molded to impart the properties necessary for electronic/electrical manufacturing and assembly, while other areas may be molded from low cost engineering resins to impart mechanical and design properties at a low cost. Advanced plastics processing technologies such as co-injection molding and co-extrusion make these designs possible. The finished part will have mechanical and design properties of the low cost engineering resin with a capacity for integrated electronics in one low cost system. This integration of electronic circuitry into structural components reduces overall material costs from separate electronic/electrical and mechanical substrates, reduces overall material cost and weight, and reduces part count while increasing reliability.

The resin materials implemented in these structures must comply with two fundamental requirements. First, the materials must exhibit adequate physical, thermal, environmental, and electrical properties to meet the requirements of the intended application. Second, the materials chosen must be compatible with one another so that interfacial bonding may be maintained during processing and operation to avoid mechanical failure. Examples of resin systems that may potentially exhibit compatibility in these applications include: 1) ABS (structural) with PPO/PS (electrical); 2) polyethylene (structural) with reinforced polypropylene (electrical), etc.

Numerous geometric variations exist for this technology, including, for example: 1) the electronic grade resin materials may form only a surface coating of the finished part, the bulk being composed of low cost engineering thermoplastic resins; 2) the electronic grade resin materials may run on one or multiple sides of a three dimensional component to allow 3-D electrical current flow; 3) the electronic grade resin materials may run through the cross-section of a part to allow the incorporation of electrical through-hole technologies; and 4) the electronic grade materials should be used only in areas requiring electronics to minimize cost, however, electronic grade materials may be used outside the electronics region in order to gain other resin properties such as dimensional stability, modulus, etc.

FIG. 3 shows a cut-away perspective view of an embodiment of such a co-injection molded support component. In this embodiment, the material designated "A" would be electrical grade polymer, and the material designated "B" would be non-electrical grade polymer, such that the "B" polymer would be a low cost support-type material, and the "A" polymer would be a polymer adapted for receiving circuit traces and electronic devices thereon.

While the best modes for carrying out the invention have been described in detail, those familiar with the art to which this invention relates will recognize various alternative designs and embodiments for practicing the invention within the scope of the appended claims.

What is claimed is:

1. An apparatus for cooling electronic devices in a vehicle, comprising:

a main ventilation duct mounted in the vehicle and including a blower for forcing air through the main duct; and a bypass duct in selective fluid communication with said main ventilation duct, and adapted to carry electronic devices on a wall thereof to be cooled by air forced through the bypass duct.

2. The apparatus of claim 1 wherein said bypass duct comprises an inlet portion in communication with said main ventilation duct and an outlet portion in selective fluid communication with said main ventilation duct, and said bypass duct forms an ambient opening adjacent said outlet, and said apparatus further comprises:

an inlet valve positioned adjacent said inlet portion for selectively diverting air flow from said main ventilation duct through said bypass duct; and an outlet valve positioned adjacent said outlet portion for selectively alternatively blocking air flow through said outlet portion and said ambient opening.

3. The apparatus of claim 2 wherein said electronic devices are positioned inside said bypass duct.

4. The apparatus of claim 3 wherein said electronic devices are housed in at least one sealed container.

5. The apparatus of claim 2 wherein said electronic devices are positioned outside said bypass duct.

6. The apparatus of claim 5 wherein said bypass duct includes a metal plate for mounting the electronics thereon, said metal plate encouraging heat dissipation from the electronic devices.

7. An apparatus for cooling electronic devices in a vehicle, comprising:

a main ventilation duct mounted in the vehicle and including a blower for forcing air through the main ventilation duct;

a bypass duct in selective communication with said main ventilation duct, and adapted to carry electronic devices to be cooled by air forced through the bypass duct, said bypass duct including inlet and outlet portions in selective fluid communication with said main ventilation duct and an ambient opening formed adjacent said outlet;

an inlet valve positioned adjacent said inlet portion for selectively diverting air flow from said main ventilation duct through said bypass duct; and an outlet valve positioned adjacent said outlet portion for selectively alternatively blocking air flow through said outlet portion and said ambient opening.

8. The apparatus of claim 7 wherein said electronic devices are positioned inside said bypass duct.

9. The apparatus of claim 7 wherein said electronic devices are positioned outside said bypass duct.

10. An apparatus for cooling electronic devices in a vehicle, comprising:

a main ventilation duct mounted in the vehicle and including a blower for forcing air through the main ventilation duct;

a bypass duct in selective communication with said main ventilation duct, and adapted to carry electronic devices to be cooled by air forced through the bypass duct, said bypass duct including inlet and outlet portions in selective fluid communication with said main ventilation duct and an ambient opening formed adjacent said outlet;

an inlet valve positioned adjacent said inlet portion for selectively diverting flow from said main ventilation duct through said bypass duct;

an outlet valve positioned adjacent said outlet portion for selectively alternatively blocking air flow through said outlet portion and said ambient opening; and wherein said electronic devices are positioned within at least one sealed container inside the bypass duct.

* * * * *